(12) United States Patent
Yuan et al.

(10) Patent No.: US 12,231,281 B2
(45) Date of Patent: Feb. 18, 2025

(54) FRAME STRUCTURE INDICATION METHOD, FRAME STRUCTURE UPDATING METHOD, AND RELATED DEVICE

(71) Applicant: VIVO MOBILE COMMUNICATION CO., LTD., Dongguan (CN)

(72) Inventors: Pu Yuan, Dongguan (CN); Fei Qin, Dongguan (CN); Dajie Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 20 days.

(21) Appl. No.: 18/116,831

(22) Filed: Mar. 2, 2023

(65) Prior Publication Data

US 2023/0208698 A1    Jun. 29, 2023

Related U.S. Application Data

(63) Continuation of application No. PCT/CN2021/116472, filed on Sep. 3, 2021.

(30) Foreign Application Priority Data

Sep. 4, 2020 (CN) ......................... 202010923662.1

(51) Int. Cl.
*H04L 27/34* (2006.01)
*H04L 25/02* (2006.01)

(52) U.S. Cl.
CPC ...... *H04L 27/3455* (2013.01); *H04L 25/0226* (2013.01)

(58) Field of Classification Search
CPC ............ H04L 27/3455; H04L 25/0226; H04L 25/0222; H04L 27/2602; H04L 27/2639;
(Continued)

(56) References Cited

U.S. PATENT DOCUMENTS

| 7,379,496 B2 * | 5/2008 | Holcomb | ............. H04N 19/527 |
| | | | 375/240.03 |
| 10,425,513 B2 * | 9/2019 | Du | ........................ H04L 5/0007 |

(Continued)

FOREIGN PATENT DOCUMENTS

| CN | 103716143 A | 4/2014 |
| CN | 107493603 A | 12/2017 |

(Continued)

OTHER PUBLICATIONS

Extended European Search Report issued in related European Application No. 21863704.9, mailed Jan. 29, 2024, 10 pages.
(Continued)

*Primary Examiner* — Emmanuel Bayard
(74) *Attorney, Agent, or Firm* — IPX PLLC (57) ABSTRACT

A method for indicating a frame structure, a method for updating a frame structure, and related devices are provided. The method for indicating a frame structure, performed by a first device, includes: determining a first frame structure based on user data to be transmitted; and when the first frame structure is different from a second frame structure corresponding to a second device, sending indication information, where the indication information is used to indicate the first frame structure.

20 Claims, 6 Drawing Sheets

Determine a first frame structure based on user data to be transmitted — 501

In a case that the first frame structure is different from a second frame structure corresponding to a second device, send indication information — 502

(58) Field of Classification Search
CPC .. H04L 25/0224; H04L 25/0202; H04L 69/06
USPC .......................................... 375/260–261, 267
See application file for complete search history.

(56) References Cited

U.S. PATENT DOCUMENTS

| | | | |
|---|---|---|---|
| 2015/0264683 A1 | 9/2015 | Kim et al. | |
| 2018/0242238 A1* | 8/2018 | Ma | H04L 1/0001 |
| 2018/0262306 A1 | 9/2018 | Hadani et al. | |
| 2019/0037580 A1* | 1/2019 | Oh | H04L 5/1469 |
| 2019/0104520 A1* | 4/2019 | Kim | H04L 5/0053 |
| 2019/0123872 A1* | 4/2019 | Au | H04L 5/003 |
| 2019/0230521 A1* | 7/2019 | Tomeba | H04B 7/0695 |
| 2019/0379422 A1 | 12/2019 | Hadani et al. | |
| 2019/0380113 A1* | 12/2019 | Shin | H04W 72/23 |
| 2020/0221523 A1* | 7/2020 | Hosseini | H04L 5/001 |
| 2021/0160040 A1* | 5/2021 | Lyu | H04L 5/0094 |

FOREIGN PATENT DOCUMENTS

| | | | | |
|---|---|---|---|---|
| WO | 2017188486 A1 | 11/2017 | | |
| WO | WO-2017215368 A1 * | 12/2017 | ............ | H04W 72/04 |

OTHER PUBLICATIONS

International Search Report issued in corresponding International Application No. PCT/CN2021/116472, mailed Nov. 26, 2021, 4 pages.
First Office Action issued in related Chinese Application No. 202010923662.1, mailed Dec. 27, 2022, 6 pages.

* cited by examiner

501 — Determine a first frame structure based on user data to be transmitted

502 — In a case that the first frame structure is different from a second frame structure corresponding to a second device, send indication information

FRAME STRUCTURE INDICATION METHOD, FRAME STRUCTURE UPDATING METHOD, AND RELATED DEVICE

CROSS-REFERENCE TO RELATED APPLICATIONS

This application is a continuation of International Application No. PCT/CN2021/116472, filed Sep. 3, 2021, which claims priority to Chinese Patent Application No. 202010923662.1, filed Sep. 4, 2020. The entire contents of each of the above-referenced applications are expressly incorporated herein by reference.

TECHNICAL FIELD

This application pertains to the field of communications technologies, and in particular, to a frame structure indication method, a frame structure updating method, and a related device.

BACKGROUND

In the complex electromagnetic wave transmission environment, there is a large quantity of scattering, reflection, and refraction surfaces, which cause that wireless signals arrive at a receive antenna through different paths at different moments, that is, the multipath effect of transmission. Inter Symbol Interference (ISI) occurs when symbols before and after a sending signal arrive simultaneously through different paths, or when the latter symbol arrives within the delay spread of the previous symbol. Similarly, in frequency domain, due to the Doppler effect caused by a relative speed between a transmit end and a receive end, each subcarrier where a signal is located may have different degrees of frequency offset, resulting in overlapping of subcarriers that may be orthogonal, that is, Inter Carrier Interference (ICI). In communications technology, the orthogonal frequency division multiplex (OFDM) multi-carrier system can be used, and a cyclic prefix (CP) is added to improve the anti-ISI performance. However, because the subcarrier spacing of the OFDM multi-carrier system is limited, in a high-speed moving scenario (such as the high-speed railway), a relatively large Doppler frequency shift caused by a relatively large relative speed between the transmit end and the receive end destroys the orthogonality between OFDM subcarriers, resulting in serious ICI between subcarriers.

The Orthogonal Time Frequency Space (OTFS) technology may also be used in communications technology. The OTFS technology defines the transformation between a delay Doppler domain and a time-frequency domain, and at the transmit end and the receive end, by simultaneously mapping service data and pilot to the delay Doppler domain for processing, the delay and Doppler characteristics of the channel are captured by using the pilot in the delay Doppler domain. In the process of channel estimation, the channel estimation performance is controlled by adjusting a side length M of a frame structure in a delay dimension and/or a side length N of the frame structure in a Doppler dimension. However, an excessively large setting of M*N may cause a waste of resources, while an excessively small setting of M*N cannot avoid pilot pollution.

SUMMARY

Embodiments of this application provide a frame structure indication method, a frame structure updating method, and a related device.

According to a first aspect, a frame structure indication method is provided, where the method is performed by a first device and includes:
 determining a first frame structure based on user data to be transmitted; and
 in a case that the first frame structure is different from a second frame structure corresponding to a second device, sending indication information, where the indication information is used to indicate the first frame structure.

According to a second aspect, a frame structure updating method is provided, where the method is performed by a second device and includes:
 receiving indication information sent by a first device, where the indication information is used to indicate a first frame structure; and
 updating a second frame structure corresponding to the second device with the first frame structure, where
 the first frame structure is determined based on user data to be transmitted.

According to a third aspect, a frame structure indication apparatus is provided, and the apparatus includes:
 a first determining module, configured to determine a first frame structure based on user data to be transmitted; and
 a first sending module, configured to: in a case that the first frame structure is different from a second frame structure corresponding to a second device, send indication information, where the indication information is used to indicate the first frame structure.

According to a fourth aspect, a frame structure updating apparatus is provided, and the apparatus includes:
 a second receiving module, configured to receive indication information sent by a first device, where the indication information is used to indicate a first frame structure; and
 an updating module, configured to update a second frame structure corresponding to the second device with the first frame structure, where
 the first frame structure is determined based on user data to be transmitted.

According to a fifth aspect, a communications device is provided. The communications device includes a processor, a memory, and a program or an instruction stored in the memory and executable on the processor, where when the program or the instruction is executed by the processor, steps of the method according to the first aspect or the second aspect are implemented.

According to a sixth aspect, a readable storage medium is provided, where the readable storage medium stores a program or an instruction, and when the program or the instruction is executed by a processor, steps of the method according to the first aspect or the second aspect are implemented.

According to a seventh aspect, an embodiment of this application provides a chip, where the chip includes a processor and a communications interface, the communications interface is coupled to the processor, and the processor is configured to run a program or an instruction of a network device, to implement the method according to the first aspect.

In this embodiment of this application, the first frame structure is determined based on the user data to be transmitted; and in a case that the first frame structure is different from the second frame structure corresponding to the second device, indication information is sent, where the indication information is used to indicate the first frame structure. In this way, the frame structure can be flexibly adjusted based on the user data to be transmitted, thus ensuring the estimation accuracy and reducing the waste of resources.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in the specification and claims of this application are used to distinguish between similar objects instead of describing a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that the technology described in the embodiments of this application is not limited to a Long Term Evolution (LTE)/LTE-advanced (LTE-A) system, and may also be used in various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, a New Radio (NR) system is described below as an example, and the term NR is used in most of the descriptions, although these technologies can also be used in an application other than an application of the NR system, for example, a 6th generation (6G) communications system.

Figure 1:
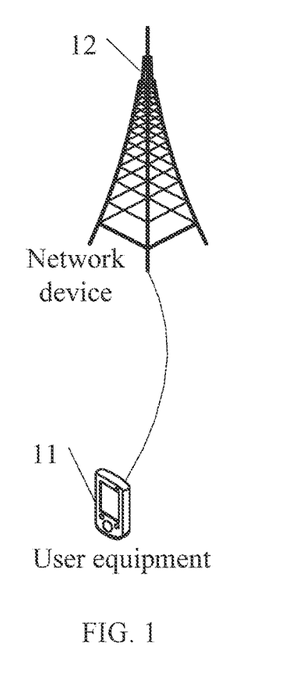
FIG. 1 is a structural diagram of a network system to which embodiments of this application can be applied.

FIG. 1 is a block diagram of a wireless communications system to which embodiments of this application can be applied. The wireless communications system includes user equipment 11 and a network device 12. The user equipment 11 may also be referred to as a terminal device or User Equipment (UE). The user equipment 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a bracelet, a headset, glasses, or the like. It should be noted that a specific type of the user equipment 11 is not limited in the embodiments of this application. The network device 12 may be a base station or a core network device. The base station may be referred to as a NodeB, an evolved Node B, an access point, a Base Transceiver Station (BTS), a radio base station, a radio transceiver, a Basic Service Set (BSS), an Extended Service Set (ESS), a home NodeB, a home evolved NodeB, a WLAN access point, a WiFi node, a Transmitting Receiving Point (TRP), or another suitable term in the field provided that a same technical effect is achieved. The base station is not limited to a specific technical term. It should be noted that, in the embodiments of this application, only a base station in an NR system is used as an example, but a specific type of the base station is not limited.

For ease of understanding, the following describes some content in the embodiments of this application:

Channel delay and Doppler characteristics are essentially determined by a multipath channel. Signals arriving at a receiver through different paths have different arrival times because of different propagation distances. For example, if two echoes $s_1$ and $s_2$ separately go through a distance of $d_1$ and $d_2$ to reach the receiver, a time difference between their arriving at the receiver is $$\Delta t = \frac{|d_1 - d_2|}{c},$$

and c is a speed of light. Because of this time difference between echoes $s_1$ and $s_2$, a coherent superposition thereof at the receiver side causes an observed signal amplitude jitter, that is, the fading effect. Similarly, the Doppler spread of multipath channel is also caused by multipath effect. As we know, the Doppler effect is formed due to a relative speed between a transmit end and a receive end, and signals reaching the receiver through different paths have different incident angles relative to a normal line of an antenna, which leads to the difference of the relative speed, thus resulting in different Doppler frequency shifts of signals in different paths. If an original frequency of the signal is $f_0$, the relative speed of the transmit end and the receive end is $\Delta V$, and the incident angle between the signal and the normal line of an antenna in the receive end is $\theta$, $\Delta v = \Delta V/f \cos \theta$. Obviously, when two echoes $s_1$ and $s_2$ arrive at the antenna in the receive end through different paths and have different incident angles $\theta_1$ and $\theta_2$, Doppler frequency shifts $\Delta v_1$ and $\Delta v_2$ thereof are also different. In conclusion, a signal seen from the receiver is superposition of component signals with different delays and Doppler effects from different paths, which is a received signal with fading effect and frequency shift relative to the original signal. Performing a delay Doppler analysis on the channel is helpful to collect delay Doppler information of each path, thus reflecting a delay Doppler response of the channel.

The full name of OTFS modulation technology is Orthogonal Time Frequency Space (OTFS) modulation. In this technology, information in a data packet of a size of M×N, such as a Quadrature Amplitude Modulation (QAM) symbol, is logically mapped to a M×N lattice point on a two-dimensional delay Doppler plane, that is, a pulse in each lattice point modulates a QAM symbol in the data packet. Further, by designing a group of orthogonal two-dimensional basis functions, a data set in the delay Doppler domain plane of M×N is transformed into a time-frequency domain plane of N×M, which is mathematically referred to as Inverse Symplectic Finite Fourier Transform (ISFFT). Correspondingly, the transformation from the time-frequency domain to the delay Doppler domain is referred to as Symplectic Finite Fourier Transform (SFFT). The physical meaning behind it is the delay and Doppler effect of the signal, which is actually a linear superposition effect of a series of echoes with different time and frequency offsets after a signal passes through the multipath channel. In this sense, the delay Doppler analysis and the time-frequency domain analysis may be obtained by mutual conversion of ISFFT and SFFT.

Figure 2:
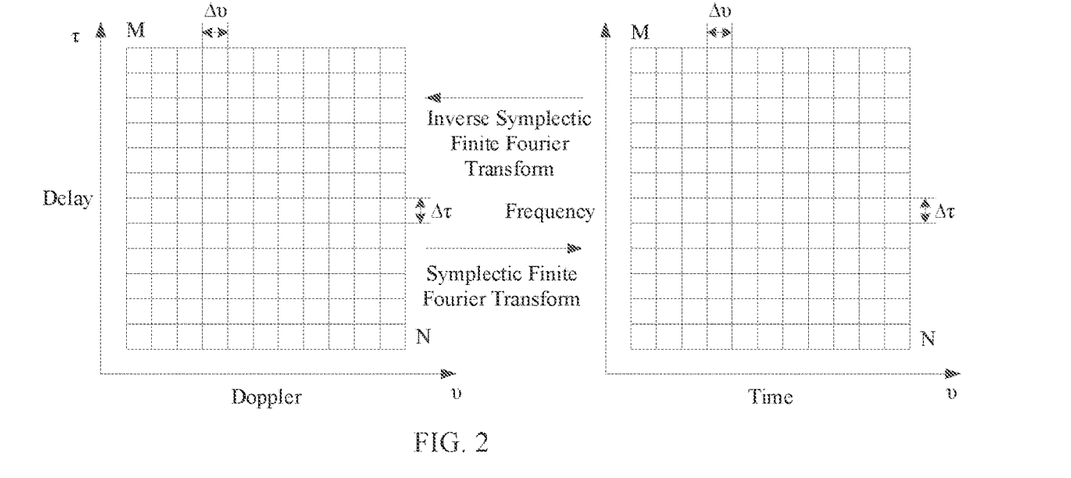
FIG. 2 is a schematic diagram of conversion between a delay Doppler plane and a time-frequency plane.

The foregoing lattice point can be understood as a Resource element (RE), and the foregoing conversion relationship is shown in FIG. 2.

Therefore, the OTFS technology transforms a time-varying multipath channel into a time-invariant two-dimensional delay Doppler domain channel (in a specific period of time), which directly reflects the channel delay Doppler response characteristics in a wireless link due to geometric characteristics of a relative position of reflectors between transceivers. The advantage is that the OTFS eliminates the difficulty of tracking time-varying fading characteristics in the traditional time-frequency domain analysis, and all diversity characteristics of a channel in a time-frequency domain are extracted through delay Doppler domain analysis. In an actual system, a quantity of delay paths and Doppler frequency shifts of the channel is far less than a quantity of time domain and frequency domain responses of the channel, so a channel characterized by the delay Doppler domain is more concise. Therefore, the OTFS technology is used to perform analysis in the delay Doppler domain, so that the packaging of reference signals is more compact and flexible, especially beneficial to support large antenna arrays in a large-scale Multi-User Multiple-Input Multiple-Output (MIMO) system.

Figure 3:
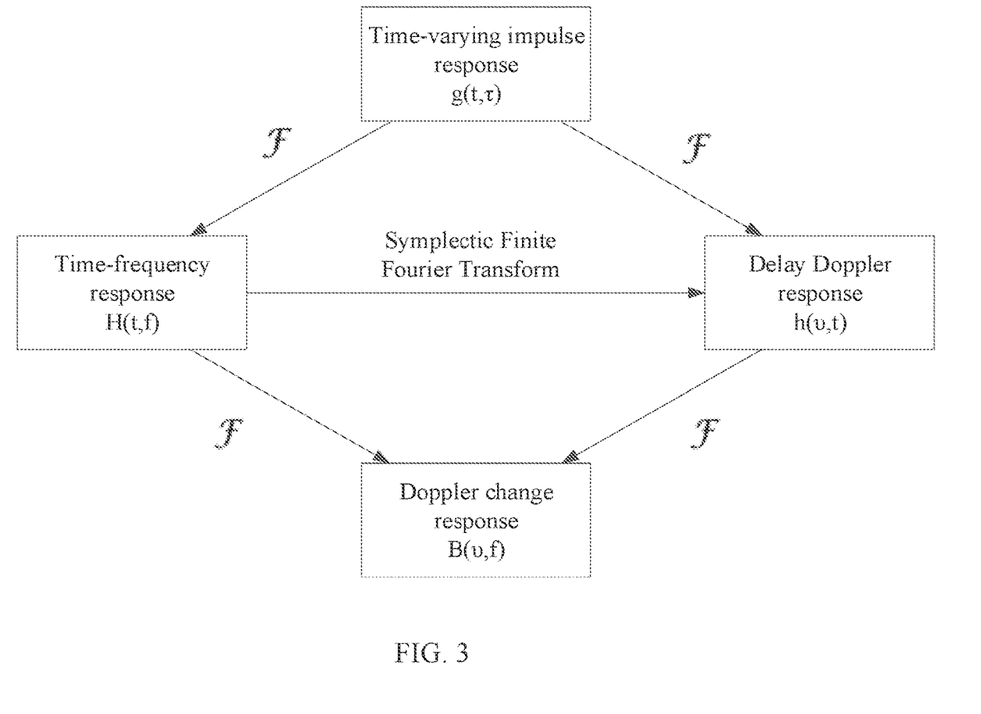
FIG. 3 is a schematic diagram of a channel response relationship in different planes.

OTFS modulation defines a QAM symbol on the delay Doppler plane, the QAM symbol is transformed into the time-frequency domain for transmission, and the receive end returns to the delay Doppler domain for processing. Therefore, the wireless channel response analysis method in the delay Doppler domain may be introduced. When a signal passes through a linear time-varying wireless channel, a relationship between expressions of the channel response in different planes is shown in FIG. 3:

In FIG. 3, the SFFT transformation formula is:

$$h(\tau,\nu) = \iint H(t,f) e^{-j2\pi(\nu t - f\tau)} dt df \qquad (1.)$$

Correspondingly, the transformation formula of ISFFT is:

$$H(t,f) = \iint h(\tau,\nu) e^{j2\pi(\nu t - f\tau)} d\tau d\nu \qquad (2.)$$

When a signal passes through a linear time-varying channel, a received signal in time domain is r(t), and correspondingly, a received signal in frequency domain is R(f), and $r(t) = \mathcal{F}^{-1}\{R(f)\}$. r(t) can be expressed in the following form:

$$r(t) = s(t) * h(t) = \int g(t,\tau) s(t-\tau) d\tau \qquad (3.)$$

It can be learned from the relationship in FIG. 3 that, $$g(t,\tau) = \int h(\nu,\tau) e^{j2\pi\nu t} d\nu \qquad (4.)$$

By substituting (4) into (3), it can be learned that:

$$r(t) = \iint h(\nu,\tau) s(t-\tau) e^{j2\pi\nu t} d\tau d\nu \qquad (5.)$$

It can be learned according to the relationship shown in FIG. 3, the classical Fourier transform theory, and the formula (5) that, $$\begin{aligned} r(t) &= \iint h(\nu,\tau) \left( \int S(f) e^{j2\pi f(t-\tau)} df \right) e^{j2\pi\nu t} d\tau d\nu \\ &= \int \left( \iint h(\nu,\tau) e^{j2\pi(\nu t - f\tau)} d\tau d\nu \right) S(f) e^{j2\pi ft} df \\ &= \int H(t,f) S(f) e^{j2\pi ft} df \\ &= \mathcal{F}^{-1}\{R(f)\} \end{aligned} \qquad (6)$$

ν represents a delay variable, τ represents a Doppler variable, f represents a frequency variable, and t represents a time variable.

Equation (6) implies that the analysis of delay Doppler domain in the OTFS system can be realized by relying on the existing communication framework based on the time-frequency domain and adding an additional signal processing process at the transmit end and the receive end. In addition, the additional signal processing only includes Fourier transform, which can be realized by the existing hardware without adding a new module. This good compatibility with the existing hardware system greatly facilitates the application of the OTFS system. In an actual system, the OTFS technology can be easily implemented as front and rear processing modules of a filter OFDM system, so the OTFS technology has good compatibility with the multi-carrier system under the existing NR technology framework.

When the OTFS is combined with a multi-carrier system, the transmit end is implemented as follows: a QAM symbol including information to be transmitted is carried on a waveform of the delay Doppler plane, is converted into a waveform of the time-frequency domain plane in the traditional multi-carrier system through a two-dimensional ISFFT, then is converted into a time-domain sampling point through symbol-level one-dimensional Inverse Fast Fourier Transform (IFFT) and serial-to-parallel conversion, and is sent out.

The receive end of the OTFS system is roughly a reverse process of the transmit end: after being received by the receiver, the time-domain sampling point is converted into the waveform on the time-frequency domain plane through parallel-to-serial conversion and symbol-level one-dimensional Fast Fourier Transform (FFT), and then is converted into the waveform on the delay Doppler domain plane through SFFT. The QAM symbol carried on the delay Doppler domain waveform is processed by the receiver, including channel estimation and equalization, demodulation and decoding, and the like.

The advantages of OTFS modulation are mainly reflected in the following aspects:

OTFS modulation transforms the time-varying fading channel in the time-frequency domain between transceivers into a deterministic fading-free channel in the delay Doppler domain. In the delay Doppler domain, each symbol in a group of information symbols sent at one time experiences the same static channel response and Signal Noise Ratio (SNR).

The OTFS system analyzes the reflector in the physical channel through a delay Doppler image, and coherently combines energies from different reflection paths with a receiving equalizer, which actually provides a static channel response without fading. With the foregoing static channel characteristics, the OTFS system doesn't need to introduce closed-loop channel adaptation like the OFDM system to deal with fast-changing channels, thus improving the robustness of the system and reducing the complexity of system design.

Because a quantity of delay-Doppler states in the delay Doppler domain is much smaller than a quantity of time-frequency states in the time-frequency domain, the channel in the OTFS system can be expressed in a very compact form. The OTFS system has less overhead and more accurate channel estimation.

Another advantage of the OTFS is dealing with a channel with ultra-high Doppler. By analyzing the delay Doppler image with an appropriate signal processing parameter, the Doppler characteristics of the channel will be fully presented, which is beneficial to signal analysis and processing in Doppler sensitive scenarios (such as high-speed moving and millimeter waves).

In conclusion, the channel estimation in the OTFS system uses the following method: the transmitter maps a pilot pulse on the delay Doppler domain, and the receiver uses the delay Doppler image analysis on the pilot to estimate a channel response $h(v, \tau)$ of the delay Doppler domain. Thus, a channel response expression of the time-frequency domain can be obtained based on the relationship in FIG. 3, which is convenient for signal analysis and processing with existing time-frequency domain technology. The pilot mapping on the delay Doppler plane may be performed in a manner as shown in FIG. 4.

Figure 4:
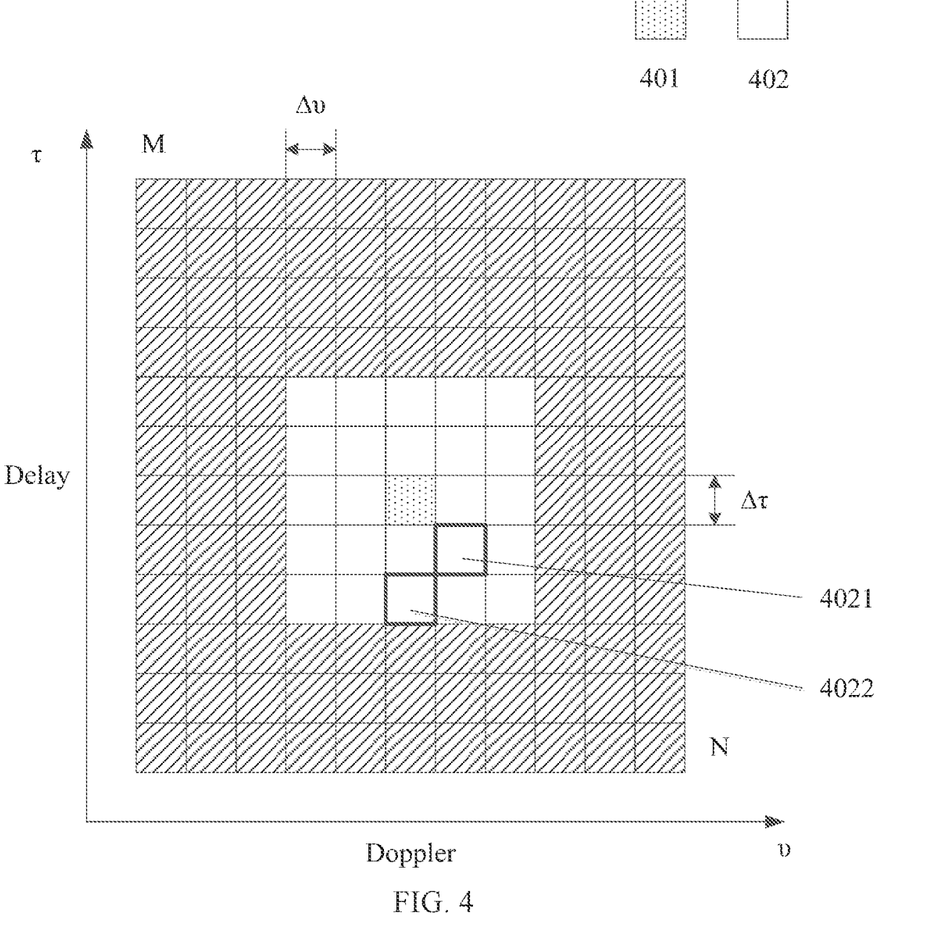
FIG. 4 is a schematic diagram of pilot mapping in a delay Doppler domain.

In FIG. 4, a sending signal is located at a single-point pilot (401) of $(l_p, k_p)$, and a surrounding area includes a protection symbol (402) of $(2l_v+1)(4k_v+1)-1$ and a data part of $MN-(2l_v+1)(4k_v+1)$. At the receive end, two offset peaks (such as 4021 and 4022) appear in a guard band of the lattice point in the delay Doppler domain, which indicates that there are two secondary paths with different delay Doppler effects besides the main path. The amplitude, delay, and Doppler parameter of all secondary paths are measured, and the delay Doppler domain expression of the channel is obtained, namely, $h(v, \tau)$. In order to prevent data on the lattice point of the received signal from polluting the pilot symbol, resulting in inaccurate channel estimation, an area of the protection symbol should meet the following conditions:

$$l_v \geq \tau_{max} M \Delta f, k_v \geq v_{max} N \Delta T \qquad (7)$$

$\tau_{max}$ and $v_{max}$ are respectively the maximum delay and maximum Doppler shift of all paths of the channel. A plurality of protection symbols 402 surround the single-point pilot 401 to form a guard band, and the plurality of protection symbols 402 are corresponding to blank resource elements.

A plane M*N in FIG. 2 and FIG. 4 is actually a discrete point value on a two-dimensional delay Doppler plane, and each grid is corresponding to a quantized delay-Doppler pair $(\tau_i, v_j)$. When a total quantity of resources is fixed (a bandwidth and a time are fixed), the larger M*N is, the more the grids are, which is equivalent to improving the quantization accuracy of the discrete delay-Doppler point. The larger M is, the more delays that can be resolved through delay Doppler analysis are, which can be understood as improving the delay resolution; the larger N is, the more Doppler shift values that can be resolved through delay Doppler analysis are, which can be understood as improving the Doppler resolution. With the improvement of multipath and Doppler resolution, more information about the channel response can be obtained. Thus, the channel can be estimated more accurately and the decoding performance of the receiver can be improved.

However, there is an upper limit to the gain brought by increasing the value of M*N. The delay Doppler characteristics of the channel are actually generated by the signal going through the multipath channel. A quantity of multipaths of a channel depends on a quantity of reflectors in the channel, so it cannot be infinite. In addition, the delay of the channel and the quantity of states of Doppler response are also limited by the quantity of multipaths, so they cannot be infinite either. Therefore, a specific amount of M*N can meet the system design requirements. In addition, the size of M*N should also based on the size of the data block. For small data, in theory, only a smaller M*N resource is required to carry. However, the smaller M*N implies a smaller channel resolution, and there is a risk of channel estimation performance degradation. However, if M*N is increased blindly in pursuit of channel resolution, for the small data, excessive design may result in the waste of resources.

With reference to the accompanying drawings, the frame structure indication method provided in the embodiments of this application is described in detail by using specific embodiments and application scenarios.

Figure 5:
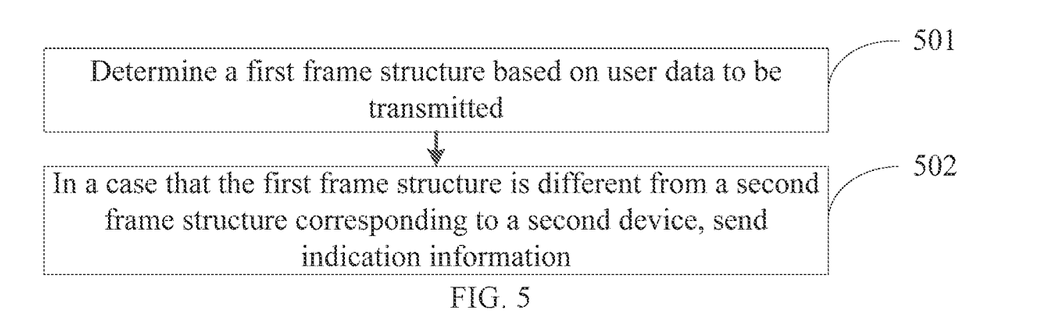
FIG. 5 is a flowchart of a frame structure indication method according to an embodiment of this application.

Referring to FIG. 5, FIG. 5 is a flowchart of a frame structure indication method according to an embodiment of this application. The method is performed by a first device. As shown in FIG. 5, the method includes the following steps.

Step 501. Determine a first frame structure based on user data to be transmitted.

Step 502. In a case that the first frame structure is different from a second frame structure corresponding to a second device, send indication information, where the indication information is used to indicate the first frame structure.

In some embodiments, the second device is a device for transmitting user data. The second device may be a device that receives user data or a device that sends user data. The user data to be transmitted can be understood as data to be transmitted between the first device and the second device, user data sent by the first device to the second device, or user data sent by the second device to the first device.

It should be understood that before indicating the first frame structure, the first device and the second device use the second frame structure for data transmission; after indicating the first frame structure, the first device and the second device may use the first frame structure for data transmission. In some embodiments, the user data to be transmitted can be transmitted based on the first frame structure.

In some embodiments, the first frame structure is determined based on the user data to be transmitted; and in a case that the first frame structure is different from the second frame structure corresponding to the second device, indication information is sent, where the indication information is used to indicate the first frame structure. In this way, the frame structure can be flexibly adjusted based on the user data to be transmitted, thus ensuring the estimation accuracy and reducing the waste of resources.

In some embodiments, the indication information carries an index value of the first frame structure, where different frame structures are corresponding to different index values.

In this embodiment of this application, a value M of each of a group of frame structures in the delay dimension and a value N of each of a group of frame structures in the Doppler dimension may be pre-configured or specified by a protocol, where different values of M may be associated with different values of N to be corresponding to an index value, that is, a set of values of M and a set of values of N are corresponding to an index value. In this case, the indication information may indicate the value of M and the value of N by indicating the index value associated with M and N. For example, an index 1 is associated with a frame structure 1 (M1, N1), an index 2 is associated with a frame structure 2 (M2, N2), and the indication information may directly indicate the index 1 or the index 2 to indicate a corresponding frame structure. In some embodiments, a set of values of M and a set of values of N can be understood as a set of frame structures or a set of frame structure configurations.

In some embodiments, N and M are not associated, where different values of N may be associated with different index values in a first type of index, and different values of M may be associated with different index values in a second type of index. For example, N1 is associated with an index value A1, N2 is associated with an index value A2, M1 is associated with an index value B1, and M2 is associated with an index value B2. In this case, the foregoing indication information may indicate the index of N and the index of M separately, so as to indicate the corresponding frame structure. For example, if the foregoing indication information carries B2 and A1, the indicated frame structure is (M2, N1).

In some embodiments, the indication information includes a scaling factor for indicating a delay Doppler domain, and the first frame structure is indicated by using the scaling factor and a preset reference frame structure.

In this embodiment of this application, the foregoing reference frame structure can be understood as a pre-configured frame structure, that is, a reference frame structure may be pre-specified by a protocol or pre-configured. When changing the frame structure, the currently used frame structure may be indicated by using the scaling factor. In this way, a basic group of M and N can be defined only, and the frame structure is further flexibly adjusted by using the scaling factor, so that the signaling overhead can be reduced.

It should be noted that the scaling factor may be one scaling factor or two scaling factors. When one scaling factor is used, it indicates that the scaling ratio of the first frame structure based on the reference frame structure in the delay dimension is the same as that in the Doppler dimension. When two scaling factors are used, each scaling factor represents a scaling ratio of one dimension. For example, the scaling factor includes a first scaling factor a and a second scaling factor β, and the first scaling factor is used to indicate a scaling ratio between the reference frame structure and the first frame structure in a delay dimension; the second scaling factor is used to indicate a scaling ratio between the reference frame structure and the first frame structure in a Doppler dimension. In this embodiment of this application, the first scaling factor and the second scaling factor are set to flexibly adjust the scaling ratio in different dimensions, thus improving the flexibility of frame structure adjustment.

In some embodiments, the determining a first frame structure based on user data to be transmitted includes:

determining a quantity q of the Quadrature Amplitude Modulation (QAM) symbols; and determining the first frame structure in a preset frame structure table based on q, where the preset frame structure table includes at least two values of a frame structure in a delay dimension and at least two values of a frame structure in a Doppler dimension.

In this embodiment of this application, a length N of the time domain can usually be a group of protocol specified values with a limited quantity, and the first frame structure is determined by first selecting N and then selecting M based on q.

In some embodiments, in the value set $\{N_i\}$, $i \in N_+$ of N, different sizes of $N_i$ need to satisfy a multiple relation, such as a relation of $N_0 = 2N_1 = 4N_2$. In this way, in the process of time domain adaptation, when time domain disorder occurs, the time domain can be aligned in time in a short time by selecting appropriate $N_i$, which is suitable for some specific scenarios or jointly transmitted requirements between cells, such as a Multi-User Multiple-Input Multiple-Output (MU-MIMO) scenario and a Coordinated Multiple Points (COMP) requirement.

It should be understood that q can be determined in various ways, and in some embodiments, in a case that the user data includes an original information bit a, a code rate r, a check bit length c, and a QAM modulation order k, the determining a quantity q of the QAM symbols includes:

determining the quantity q of the QAM symbols based on ceil $$\left(\log_k\left(\frac{a+c}{r}\right)\right).$$

In some embodiments, in a case that an association relationship among the subcarrier spacing of the frame structure, the value of the frame structure in the delay dimension, and the value of the frame structure in the Doppler dimension is determined in advance, q is determined based on a TB size and a preset MCS.

In this embodiment of this application, the association relationship among the subcarrier spacing $\Delta f$ of the frame structure, the value M of the frame structure in the delay dimension, and the value N of the frame structure in the Doppler dimension can be understood as at least one set of (M, N, $\Delta f$) pre-specified by a protocol or configured in a network, that is, $\Delta f$ is added to the preset frame structure table, and in the preset frame structure table, there is an association relationship between M, N and $\Delta f$, for example, a group of M, N and a group of $\Delta f$ are associated with an index value.

In some embodiments, a quantity of resource elements included in the first frame structure is greater than or equal to a quantity of quadrature amplitude modulation (QAM) symbols corresponding to the user data.

In other embodiments, a value $M_i$ of the first frame structure in a delay dimension satisfies $$\frac{q}{N_i} \le M_i \le \frac{B}{\Delta f},$$

where q is the quantity of QAM symbols corresponding to the user data, $N_i$ is the value of the first frame structure in the Doppler dimension, B is an available bandwidth, and Δf is a subcarrier spacing of the first frame structure.

In some embodiments, after the step of, in a case that the first frame structure is different from a second frame structure corresponding to a second device, sending indication information, the method further includes:

performing rate matching based on a value of the first frame structure in a delay dimension and a value of the first frame structure in a Doppler dimension, to determine a modulation and coding scheme (MCS).

In this embodiment of this application, because M and N are a group of discrete point values, which may not be exactly equal to q, and a better MCS may be obtained through rate matching, thus further improving the performance. For example, the selected first frame structure is represented by ($M_i$, $N_i$), which may be used to perform rate matching based on the selected $M_i$ and $N_i$. In some embodiments, it can be realized by adjusting r and k in the following formula:

$$r = \frac{a+c}{k^{M_i N_i}}. \quad (8)$$

It should be noted that in some embodiments, before the step of determining a first frame structure based on user data, the method further includes:

receiving recommended frame structure information sent by the second device, where
the recommended frame structure information is used to assist the first device in determining the first frame structure, and the recommended frame structure information is used to indicate at least one of the following:
at least one value of a frame structure in a delay dimension; or
at least one value of a frame structure in a Doppler dimension.

In this embodiment of this application, the foregoing first frame structure may be a combination of a value of a specific frame structure in the delay dimension and a value of a specific frame structure in the Doppler dimension in the recommended frame structure information. The first frame structure may also be a value in a specific dimension selected only from the recommended frame structure information, and the first frame structure may also be a frame structure determined not based on a value in any dimension of the recommended frame structure information, which is not further limited herein. In this embodiment of this application, the second device sends the recommended frame structure information to assist the first device in determining the first frame structure.

Therefore, to better understand this application, a detailed description will be given below through specific embodiments.

Embodiment 1

A group of M and N are predefined in the protocol in the form of tables. Tables M and N currently used in the cell are sent through a broadcast channel or a dedicated RRC. The cell instructs, through dedicated signaling, UE to use a specific item in the tables M and N. In some embodiments, the cell further instructs, through dedicated signaling, the UE to use scaling factors α and β in the delay domain and the Doppler domain of M and N.

A specific indication manner may be explicitly indicated by using Downlink Control Information (DCI) or dedicated signaling, implicitly indicated by using an association relationship between a service type and an OTFS symbol mapping mode (M and N), or implicitly indicated by using an association relationship between a Transport Block (TB) size and a scaling factor. The dedicated signaling may be a Medium Access Control Control Element (MAC CE), Radio Resource Control (RRC), or the like.

For example, a combination of a plurality of sets of M and N can be configured through RRC, and one of them can be further indicated through the MAC CE or the DCI.

In some embodiments, before the cell instructs, through dedicated signaling, the UE to use a specific item in the tables M and N, the UE may send preferred indexes M and N, which may be one or more of the tables M and N, to the cell.

Embodiment 2, on the basis of the foregoing embodiment, a parameter Δf is added to the tables M and N. M and N should satisfy MN≥q, that is, a quantity of allocated resources should be greater than the user data. In addition, when a user bandwidth B is limited, B≥MΔf needs to be satisfied. Therefore, a value range of M is $$\frac{q}{N} \leq M \leq \frac{B}{\Delta f}$$

In a frame structure, because a length N of the time domain is usually a group of protocol specified values with a limited quantity, N is selected first. Then a length $$M = \text{ceil}\left(\frac{q}{N}\right)$$

of a frequency domain is determined based on an amount of data sent by the user. Δf is determined based on obtained M, so that it can satisfy $$\Delta f \leq \frac{B}{M} = \frac{\text{ceil}\left(\frac{q}{N}\right)}{M}.$$

Therefore, a group of tables of (M, N, Δf) may be predefined by a protocol to satisfy the foregoing relationship. When necessary, the cell indicates the tables to the UE in the manner of Embodiment 1.

In some embodiments, in the value set $\{N_i\}$, $i \in N_+$ of N, different sizes of $N_i$ need to satisfy a multiple relation, such as a relation of $N_0 = 2N_1 = 4N_2$. In this way, in the process of time domain adaptation, when time domain disorder occurs, the time domain can be aligned in time in a short time by selecting appropriate $N_1$, which is suitable for some specific scenarios or jointly transmitted requirements between cells, such as an MU-MIMO scenario and a COMP requirement.

Embodiment 3: A value range of M is $$\frac{q}{N} \leq M \leq \frac{B}{\Delta f}.$$

In a frame structure, because a length N of the time domain is usually a group of protocol specified values with a limited quantity, N is selected first. Then a suitable value is selected from the table (M, N, Δf) based on a user available bandwidth B, so that MΔf≤B.

A difference between Embodiment 3 and Embodiment 2 is that a group of tables of (M, N, Δf) may be predefined in Embodiment 2, and in Embodiment 3, N may be selected first, and then the suitable value is selected from the table (M, N, Δf) based on the user available bandwidth B, so that MΔf≤B. That is, in Embodiment 3, Δf does not need to be associated with (M, N), and M and Δf are directly determined based on MΔf≤B, so as to obtain the selected frame structure.

Embodiment 4

In some embodiments, when M is configured by using the method in Embodiment 2, the user needs to first determine a quantity of transmitted symbols q. q is determined based on the pre-specified MCS and the TB size.

When M is configured by using the method in Embodiment 3, the user needs to perform rate matching on the user based on a quantity of physical resources, namely, M and N. It is assumed that a sending parameter is known as (αM, βN). The rate matching can be achieved by adjusting r and k, $$\Gamma = \frac{a+c}{k^{\alpha M \beta M}} \qquad (9)$$

and the user may first calculate a code rate r according to (9). When r is less than a specific threshold $r_o$, the current calculated value of r is used. When r is greater than a specific threshold $r_o$, it is considered that the code rate is too high to be applicable, and therefore k is increased instead, and a new r is calculated according to (9). By analogy, finally r is equal to $r_o$.

In some embodiments, when one MCS table is specified in the protocol, the user selects, based on the calculation in (9), a group of suitable combination of (r,k) to satisfy $$\alpha M \beta N \geq \log_k \frac{a+c}{r}.$$

Figure 6:
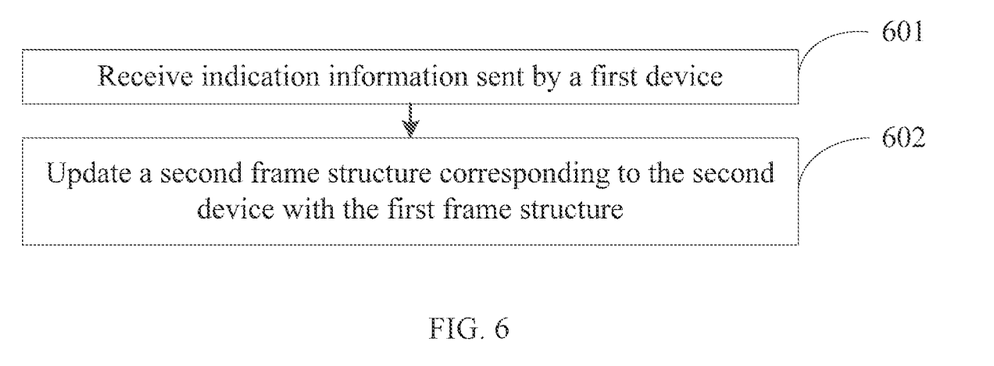
FIG. 6 is a flowchart of a frame structure updating method according to an embodiment of this application.

Referring to FIG. 6, FIG. 6 is a flowchart of a frame structure updating method according to an embodiment of this application. The method is performed by a second device. As shown in FIG. 6, the method includes the following steps.

Step 601. Receive indication information sent by a first device, where the indication information is used to indicate a first frame structure.

Step 602. Update a second frame structure corresponding to the second device with the first frame structure, where the first frame structure is determined based on user data to be transmitted.

In some embodiments, the indication information carries an index value of the first frame structure, where different frame structures are corresponding to different index values.

In some embodiments, the indication information includes a scaling factor for indicating a delay Doppler domain, and the first frame structure is indicated by using the scaling factor and a preset reference frame structure.

In some embodiments, the scaling factor includes a first scaling factor and a second scaling factor, and the first scaling factor is used to indicate a scaling ratio between the reference frame structure and the first frame structure in a delay dimension; the second scaling factor is used to indicate a scaling ratio between the reference frame structure and the first frame structure in a Doppler dimension.

In some embodiments, the method further includes:
performing rate matching based on a value of the first frame structure in a delay dimension and a value of the first frame structure in a Doppler dimension, to determine a modulation and coding scheme (MCS).

In some embodiments, a quantity of resource elements included in the first frame structure is greater than or equal to a quantity of quadrature amplitude modulation (QAM) symbols corresponding to the user data.

In some embodiments, a value $M_i$ of the first frame structure in a delay dimension satisfies $$\frac{q}{N_i} \leq M_i \leq \frac{B}{\Delta f},$$

where
q is the quantity of QAM symbols corresponding to the user data, $N_i$ is the value of the first frame structure in the Doppler dimension, B is an available bandwidth, and Δf is a subcarrier spacing of the first frame structure.

In some embodiments, in a case that an association relationship among the subcarrier spacing of the frame structure, the value of the frame structure in the delay dimension, and the value of the frame structure in the Doppler dimension is determined in advance, q is determined based on a TB size and a preset MCS.

In some embodiments, before the step of receiving indication information sent by a first device, the method further includes:
sending recommended frame structure information, where
the recommended frame structure information is used to assist the first device in determining the first frame structure, and the recommended frame structure information is used to indicate at least one of the following:
at least one value of a frame structure in a delay dimension, or
at least one value of a frame structure in a Doppler dimension.

It should be noted that this embodiment is used as an implementation of a second device corresponding to the embodiment shown in FIG. 5. For a specific implementation of this embodiment, refer to related descriptions of the embodiment shown in FIG. 5, and a same effect can be achieved. To avoid repetition, details are not described herein again.

It should be noted that the frame structure indication method provided in the embodiments of this application can be performed by a frame structure indication apparatus or a control module included in the frame structure indication apparatus and configured to perform the frame structure indication method. In an embodiment of this application, the frame structure indication apparatus provided in the embodiments of this application is described by using an example in which the frame structure indication method is performed by a frame structure indication apparatus.

Figure 7:
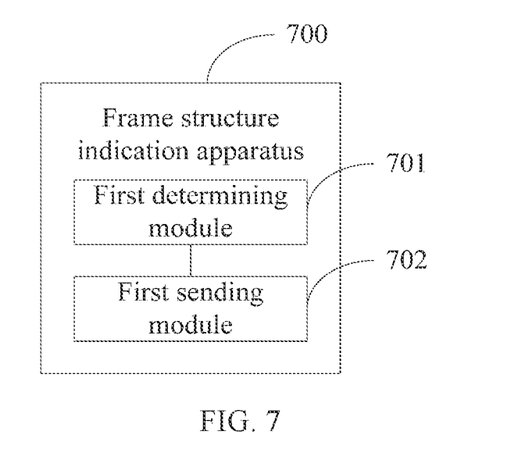
FIG. 7 is a structural diagram of a frame structure indication apparatus according to an embodiment of this application.

Referring to FIG. 7, FIG. 7 is a structural diagram of a frame structure indication apparatus according to an embodiment of this application. As shown in FIG. 7, the frame structure indication apparatus 700 includes:

a first determining module 701, configured to determine a first frame structure based on user data to be transmitted; and a first sending module 702, configured to: in a case that the first frame structure is different from a second frame structure corresponding to a second device, send indication information, where the indication information is used to indicate the first frame structure.

In some embodiments, the indication information carries an index value of the first frame structure, where different frame structures are corresponding to different index values.

In some embodiments, the indication information includes a scaling factor for indicating a delay Doppler domain, and the first frame structure is indicated by using the scaling factor and a preset reference frame structure.

In some embodiments, the scaling factor includes a first scaling factor and a second scaling factor, and the first scaling factor is used to indicate a scaling ratio between the reference frame structure and the first frame structure in a delay dimension; the second scaling factor is used to indicate a scaling ratio between the reference frame structure and the first frame structure in a Doppler dimension.

In some embodiments, the first determining module 701 is further configured to: perform rate matching based on a value of the first frame structure in a delay dimension and a value of the first frame structure in a Doppler dimension, to determine a modulation and coding scheme (MCS).

In some embodiments, a quantity of resource elements included in the first frame structure is greater than or equal to a quantity of quadrature amplitude modulation (QAM) symbols corresponding to the user data.

In some embodiments, the first determining module 701 is configured to:

determine a quantity q of the QAM symbols; and determine the first frame structure in a preset frame structure table based on q, where the preset frame structure table includes at least two values of a frame structure in a delay dimension and at least two values of a frame structure in a Doppler dimension.

In some embodiments, the first determining module 701 is configured to:

in a case that the user data includes an original information bit a, a code rate r, a check bit length c, and a QAM modulation order k, determine a quantity q of the QAM symbols based on ceil $$\left(\log_k\left(\frac{a+c}{r}\right)\right).$$

In some embodiments, a value $M_i$ of the first frame structure in a delay dimension satisfies $$\frac{q}{N_i} \le M_i \le \frac{B}{\Delta f},$$

where q is the quantity of QAM symbols corresponding to the user data, $N_i$ is the value of the first frame structure in the Doppler dimension, B is an available bandwidth, and $\Delta f$ is a subcarrier spacing of the first frame structure.

In some embodiments, in a case that an association relationship among the subcarrier spacing of the frame structure, the value of the frame structure in the delay dimension, and the value of the frame structure in the Doppler dimension is determined in advance, q is determined based on a TB size and a preset MCS.

In some embodiments, the frame structure indication apparatus 700 further includes:

a first receiving module, configured to receive recommended frame structure information sent by the second device, where the recommended frame structure information is used to assist the first device in determining the first frame structure, and the recommended frame structure information is used to indicate at least one of the following:

at least one value of a frame structure in a delay dimension; or at least one value of a frame structure in a Doppler dimension.

The network device provided in this embodiment of this application can implement the processes implemented by the first device in the method embodiment of FIG. 5. To avoid repetition, details are not described herein again.

It should be noted that the frame structure updating method provided in the embodiments of this application can be performed by a frame structure updating apparatus or a control module included in the frame structure updating apparatus and configured to perform the frame structure updating method. In an embodiment of this application, the frame structure updating apparatus provided in the embodiments of this application is described by using an example in which the frame structure updating method is performed by a frame structure updating apparatus.

Figure 8:
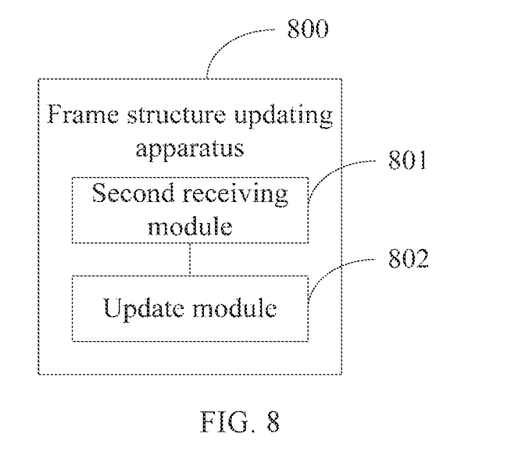
FIG. 8 is a structural diagram of a frame structure updating apparatus according to an embodiment of this application.

Referring to FIG. 8, FIG. 8 is a structural diagram of a frame structure updating apparatus according to an embodiment of this application. As shown in FIG. 8, the frame structure updating apparatus 800 includes:

a second receiving module 801, configured to receive indication information sent by a first device, where the indication information is used to indicate a first frame structure; and an updating module 802, configured to update a second frame structure corresponding to the second device with the first frame structure, where the first frame structure is determined based on user data to be transmitted.

In some embodiments, the indication information carries an index value of the first frame structure, where different frame structures are corresponding to different index values.

In some embodiments, the indication information includes a scaling factor for indicating a delay Doppler domain, and the first frame structure is indicated by using the scaling factor and a preset reference frame structure.

In some embodiments, the scaling factor includes a first scaling factor and a second scaling factor, and the first scaling factor is used to indicate a scaling ratio between the reference frame structure and the first frame structure in a delay dimension; the second scaling factor is used to indicate a scaling ratio between the reference frame structure and the first frame structure in a Doppler dimension.

In some embodiments, the frame structure updating apparatus 800 further includes:

a second determining module, configured to perform rate matching based on a value of the first frame structure in a delay dimension and a value of the first frame structure in a Doppler dimension, to determine a modulation and coding scheme (MCS).

In some embodiments, a quantity of resource elements included in the first frame structure is greater than or equal to a quantity of quadrature amplitude modulation (QAM) symbols corresponding to the user data.

In some embodiments, a value $M_i$ of the first frame structure in a delay dimension satisfies $$\frac{q}{N_i} \leq M_i \leq \frac{B}{\Delta f},$$

where q is the quantity of QAM symbols corresponding to the user data, $N_i$ is the value of the first frame structure in the Doppler dimension, B is an available bandwidth, and $\Delta f$ is a subcarrier spacing of the first frame structure.

In some embodiments, in a case that an association relationship among the subcarrier spacing of the frame structure, the value of the frame structure in the delay dimension, and the value of the frame structure in the Doppler dimension is determined in advance, q is determined based on a TB size and a preset MCS.

In some embodiments, the frame structure updating apparatus 800 further includes:

a second sending module, configured to send recommended frame structure information, where the recommended frame structure information is used to assist the first device in determining the first frame structure, and the recommended frame structure information is used to indicate at least one of the following:

at least one value of a frame structure in a delay dimension, or at least one value of a frame structure in a Doppler dimension.

The network device provided in this embodiment of this application can implement the processes implemented by the second device in the method embodiment of FIG. 6. To avoid repetition, details are not described herein again.

The frame structure indication apparatus and the frame structure updating apparatus in the embodiments of this application may be respectively an apparatus, or may be respectively a component, an integrated circuit, or a chip in a terminal. The apparatus may be a mobile terminal, or a non-mobile terminal. For example, the mobile terminal may include, but is not limited to the type of the user equipment 11 listed above. The non-mobile terminal may be a server, a Network Attached Storage (NAS), a personal computer (PC), a television (TV), a teller machine, a self-service machine, or the like. This is not specifically limited in the embodiments of this application.

The frame structure indication apparatus and the frame structure updating apparatus in the embodiments of this application may be respectively an apparatus with an operating system. The operating system may be an Android operating system, may be an iOS operating system, or may be another possible operating system, which is not specifically limited in the embodiments of this application.

The frame structure indication apparatus and the frame structure updating apparatus provided in the embodiments of this application can implement processes implemented in the method embodiments of FIG. 5 and FIG. 6, and a same technical effect is achieved. To avoid repetition, details are not described herein again.

Figure 9:
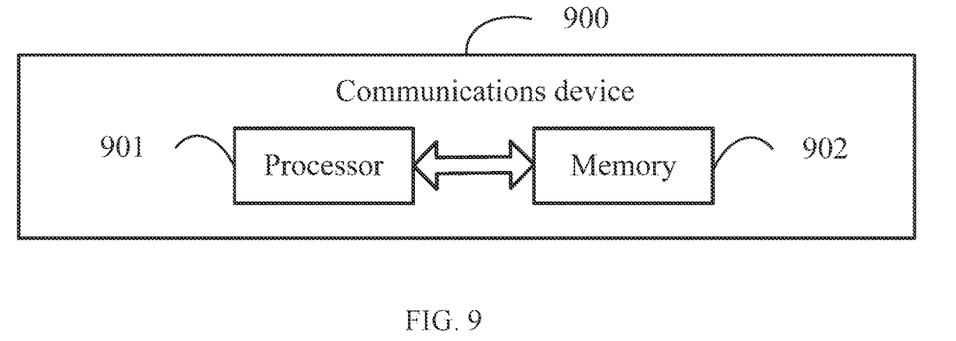
FIG. 9 is a structural diagram of a communications device according to an embodiment of this application.

As shown in FIG. 9, some embodiments of this application further provide a communications device 900, including a processor 901, a memory 902, and a program or an instruction stored in the memory 902 and executable on the processor 901. For example, when the communications device 900 is a second device, the program or the instruction is executed by the processor 901 to implement the processes of the foregoing frame structure updating method embodiment, and a same technical effect can be achieved. When the communications device 900 is a first device, the program or the instruction is executed by the processor 901 to implement the processes of the foregoing frame structure indication method embodiment, and a same technical effect can be achieved. To avoid repetition, details are not described herein again.

Figure 10:
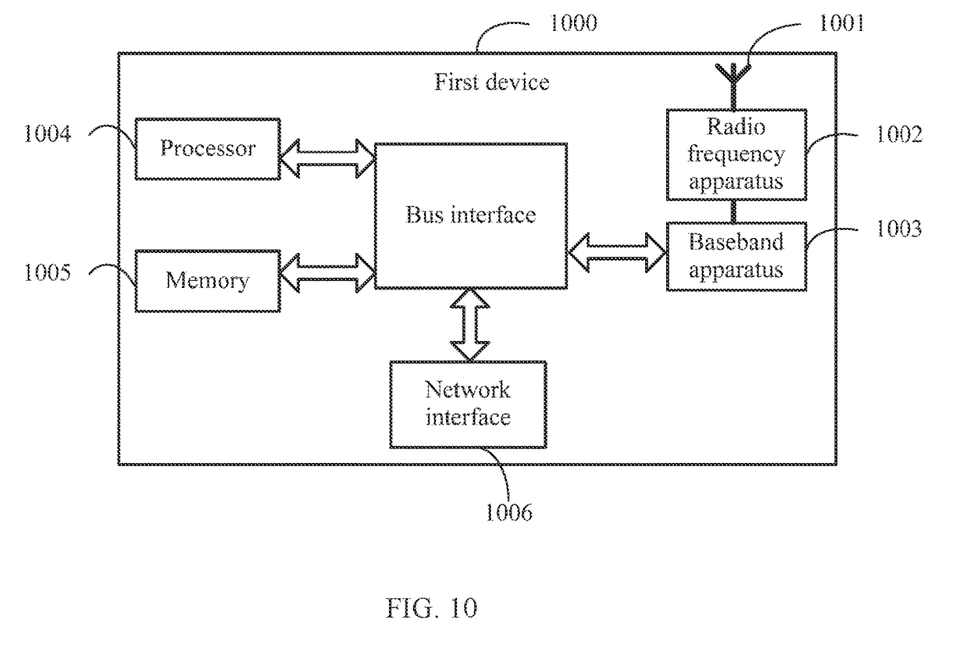
FIG. 10 is a structural diagram of a network side device according to an embodiment of this application.

An embodiment of this application further provides a network side device. The network side device may be the first device or the second device. When the first device is a terminal, the second device may be another terminal or a network side device. When the first device is a network side device, the second device is a terminal. As shown in FIG. 10, the network side device 1000 includes an antenna 1001, a radio frequency apparatus 1002, and a baseband apparatus 1003. The antenna 1001 is connected to the radio frequency apparatus 1002. In an uplink direction, the radio frequency apparatus 1002 receives information by using the antenna 1001, and sends the received information to the baseband apparatus 1003 for processing. In a downlink direction, the baseband apparatus 1003 processes information to be sent and sends the information to the radio frequency apparatus 1002, and the radio frequency apparatus 1002 processes the received information and sends the information through the antenna 1001.

The frequency band processing apparatus may be located in the baseband apparatus 1003. The method performed by the first device in the foregoing embodiment may be implemented in the baseband apparatus 1003. The baseband apparatus 1003 includes a processor 1004 and a memory 1005.

The baseband apparatus 1003 may include, for example, at least one baseband board, where a plurality of chips are disposed on the baseband board. As shown in FIG. 10, one chip is, for example, the processor 1004, which is connected to the memory 1005, so as to invoke a program in the memory 1005 to perform operations of the first device shown in the foregoing method embodiment.

The baseband apparatus 1003 may further include a network interface 1006, configured to exchange information with the radio frequency apparatus 1002, where the interface is, for example, a common public radio interface (CPRI).

The network side device in some embodiments further includes an instruction or a program stored in the memory 1005 and executable on the processor 1004. When the network side device is the first device, the processor 1004 invokes the instruction or the program in the memory 1005 to control the execution of the method performed by the modules shown in FIG. 7, when the network side device is the second device, the processor 1004 invokes the instruction or the program in the memory 1005 to control the execution of the method performed by the modules shown in FIG. 8, and a same technical effect can be achieved. To avoid repetition, details are not described herein again.

Figure 11:
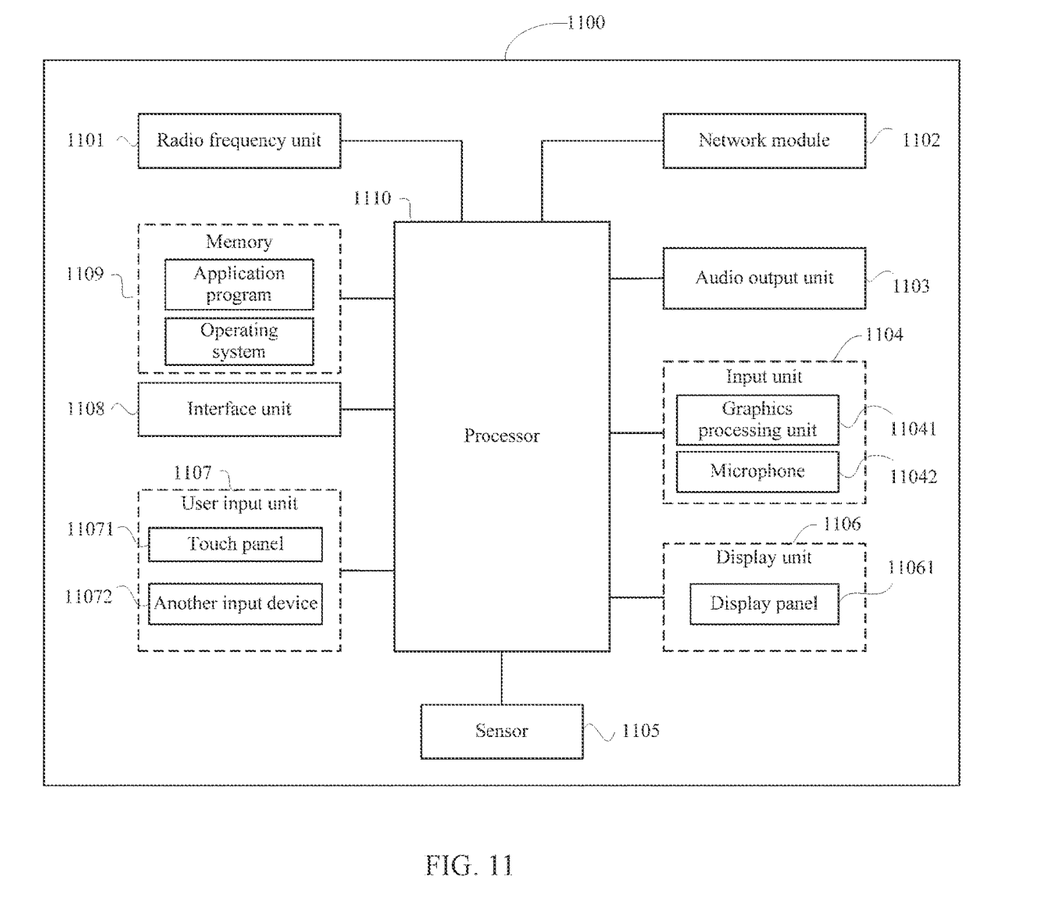
FIG. 11 is a structural diagram of a terminal device according to an embodiment of this application.

FIG. 11 is a schematic diagram of a hardware structure of a terminal device for implementing the embodiments of this application.

The terminal device 1100 includes but is not limited to components such as a radio frequency unit 1101, a network module 1102, an audio output unit 1103, an input unit 1104, a sensor 1105, a display unit 1106, a user input unit 1107, an interface unit 1108, a memory 1109, and a processor 1110.

Persons skilled in the art can understand that the terminal device 1100 may further include a power supply (such as a battery) that supplies power to each component. The power supply may be logically connected to the processor 1110 by using a power management system, to implement functions such as charging, discharging, and power consumption management by using the power management system. The terminal device structure shown in FIG. 11 constitutes no limitation on the terminal device, and the terminal device may include more or fewer components than those shown in the figure, or combine some components, or have different component arrangements. Details are not described herein.

It should be understood that, in the embodiments of this application, the input unit 1104 may include a Graphics Processing Unit (GPU) 11041 and a microphone 11042, and the graphics processing unit 11041 processes image data of a still picture or video obtained by an image capture apparatus (such as a camera) in a video capture mode or an image capture mode. The display unit 1106 may include a display panel 11061, and the display panel 11061 may be configured in a form of a liquid crystal display, an organic light-emitting diode, or the like. The user input unit 1107 includes a touch panel 11071 and another input device 11072. The touch panel 11071 is also referred to as a touchscreen. The touch panel 11071 may include two parts: a touch detection apparatus and a touch controller. The another input device 11072 may include but is not limited to a physical keyboard, a functional button (such as a volume control button or a power on/off button), a trackball, a mouse, and a joystick. Details are not described herein.

In this embodiment of this application, the radio frequency unit 1101 receives downlink data from a network device and then sends the downlink data to the processor 1110 for processing; and sends uplink data to the network device. Generally, the radio frequency unit 1101 includes but is not limited to: an antenna, at least one amplifier, a transceiver, a coupler, a low noise amplifier, a duplexer, and the like.

The memory 1109 may be configured to store a software program or an instruction and various data. The memory 109 may mainly include a program or instruction storage area and a data storage area. The program or instruction storage area may store an operating system, and an application program or an instruction required by at least one function (for example, a sound playing function or an image playing function). In addition, the memory 1109 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory. for example, at least one disk storage component, a flash memory component, or another non-volatile solid-state storage component.

The processor 1110 may include one or more processing units. In some embodiments, an application processor and a modem processor may be integrated into the processor 1110. The application processor mainly processes an operating system, a user interface, an application program, an instruction, or the like. The modem processor mainly processes wireless communications, for example, a baseband processor. It can be understood that the modem processor may not be integrated into the processor 1110.

When the first device is a terminal, and the second device is another terminal or a network side device, the processor 1110 is configured to determine a first frame structure based on user data to be transmitted; and the radio frequency unit 1101 is configured to: in a case that the first frame structure is different from a second frame structure corresponding to a second device, send indication information, where the indication information is used to indicate the first frame structure.

It should be understood that, in this embodiment, the processor 1110 and the radio frequency unit 1101 can implement the processes implemented by the second device in the method embodiment in FIG. 5. To avoid repetition, details are not described herein again.

When the second device is a terminal, and the first device is a network side device or another terminal device, the radio frequency unit 1101 is configured to receive indication information sent by a first device, where the indication information is used to indicate a first frame structure; and the processor 1110 is configured to update a second frame structure corresponding to the second device with the first frame structure, where the first frame structure is determined based on user data to be transmitted.

It should be understood that, in this embodiment, the processor 1110 and the radio frequency unit 1101 can implement the processes implemented by the second device in the method embodiment in FIG. 6. To avoid repetition, details are not described herein again.

An embodiment of this application further provides a readable storage medium, where the readable storage medium stores a program or an instruction, and when the program or the instruction is executed by a processor, the processes of the frame structure indication method embodiment or the frame structure updating method embodiment are implemented, and a same technical effect can be achieved. To avoid repetition, details are not described herein again.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communications interface, the communications interface is coupled to the processor, and the processor is configured to run a program or an instruction of a network device to implement the processes of the foregoing frame structure indication method embodiment, and a same technical effect can be achieved. To avoid repetition, details are not described herein again.

It should be understood that the chip mentioned in this embodiment of this application may also be referred to as a system-level chip, a system chip, a system on chip, an on-chip system chip, and the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. Without further restrictions, the element defined by the statement "including a . . . " does not exclude the existence of another identical element in the process, method, article or apparatus including the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a base station, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A method for indicating a frame structure, performed by a first device, comprising:
   determining a first frame structure based on user data to be transmitted; and
   when the first frame structure is different from a second frame structure corresponding to a second device, sending indication information, wherein the indication information comprises a scaling factor and a preset reference frame used to indicate the first frame structure.

2. The method according to claim 1, wherein the indication information carries an index value of the first frame structure, wherein different index values indicate different frame structures for the first frame structure.

3. The method according to claim 1, wherein the scaling factor is for indicating a delay Doppler domain.

4. The method according to claim 1, wherein the scaling factor comprises a first scaling factor and a second scaling factor,
   wherein the first scaling factor is used to indicate a scaling ratio between the reference frame structure and the first frame structure in a delay dimension; and the second scaling factor is used to indicate a scaling ratio between the reference frame structure and the first frame structure in a Doppler dimension.

5. The method according to claim 1, wherein after sending, when the first frame structure is different from the second frame structure corresponding to the second device, the indication information, the method further comprises:
   performing rate matching based on a value of the first frame structure in a delay dimension and a value of the first frame structure in a Doppler dimension, to determine a modulation and coding scheme (MCS).

6. The method according to claim 1, wherein a quantity of resource elements comprised in the first frame structure is greater than or equal to a quantity of quadrature amplitude modulation (QAM) symbols corresponding to the user data.

7. The method according to claim 6, wherein determining the first frame structure based on user data to be transmitted comprises:
   determining a quantity q of the QAM symbols; and
   determining the first frame structure in a preset frame structure table based on q, wherein the preset frame structure table comprises at least two values of a frame structure in a delay dimension and at least two values of a frame structure in a Doppler dimension.

8. The method according to claim 7, wherein when the user data comprises an original information bit a, a code rate r, a check bit length c, and a QAM modulation order k, determining the quantity of the QAM symbols comprises:
   determining the quantity q of the QAM symbols based on ceil $$\left(\log_k\left(\frac{a+c}{r}\right)\right).$$

9. The method according to claim 6, wherein a value $M_i$ of the first frame structure in a delay dimension satisfies $$\frac{q}{N_i} \le M_i \le \frac{B}{\Delta f},$$

wherein q is the quantity of QAM symbols corresponding to the user data, $N_i$ is the value of the first frame structure in the Doppler dimension, B is an available bandwidth, and $\Delta f$ is a subcarrier spacing of the first frame structure.

10. The method according to claim 9, wherein when an association relationship among the subcarrier spacing of the frame structure, the value of the frame structure in the delay dimension, and the value of the frame structure in the Doppler dimension is determined in advance, q is determined based on a TB size and a preset MCS.

11. The method according to claim 1, wherein before determining the first frame structure based on the user data, the method further comprises:
   receiving recommended frame structure information sent by the second device,
   wherein the recommended frame structure information is used to assist the first device in determining the first frame structure, and the recommended frame structure information is used to indicate at least one of the following:
   at least one value of a frame structure in a delay dimension; or
   at least one value of a frame structure in a Doppler dimension.

12. A non-transitory computer-readable storage medium, storing a computer program, wherein the computer program, when executed by a processor of a first device, causes the processor to perform the method according to claim 1.

13. A method for updating a frame structure, performed by a second device, comprising:
   receiving indication information sent by a first device, wherein the indication information comprises a scaling factor and a preset reference frame used to indicate a first frame structure; and updating a second frame structure corresponding to the second device with the first frame structure, wherein the first frame structure is determined based on user data to be transmitted.

14. The method according to claim 13, wherein before receiving the indication information sent by the first device, the method further comprises:
sending recommended frame structure information,
wherein the recommended frame structure information is used to assist the first device in determining the first frame structure, and the recommended frame structure information is used to indicate at least one of the following:
at least one value of a frame structure in a delay dimension; or
at least one value of a frame structure in a Doppler dimension.

15. A communication device, comprising a processor, a memory, and a program or an instruction stored in the memory and capable of being run on the processor, and the program or the instruction, when executed by the processor of a second device, causes the communication device to implement the method according to claim 13.

16. A non-transitory computer-readable storage medium, storing a computer program, wherein the computer program, when executed by a processor of a first device, causes the processor to perform the method according to claim 13.

17. A communications device, wherein the communications device is a first device, comprising:
a memory storing a computer program; and
a processor coupled to the memory and configured to execute the computer program to perform operations comprising:
determining a first frame structure based on user data to be transmitted; and
when the first frame structure is different from a second frame structure corresponding to a second device, sending indication information, wherein the indication information comprises a scaling factor and a preset reference frame used to indicate the first frame structure.

18. The communications device according to claim 17, wherein the indication information carries an index value of the first frame structure, wherein different index values indicate different frame structures for the first frame structure.

19. The communications device according to claim 17, wherein the scaling factor is for indicating a delay Doppler domain.

20. The communications device according to claim 17, wherein the scaling factor comprises a first scaling factor and a second scaling factor,
wherein the first scaling factor is used to indicate a scaling ratio between the reference frame structure and the first frame structure in a delay dimension; and the second scaling factor is used to indicate a scaling ratio between the reference frame structure and the first frame structure in a Doppler dimension.

* * * * *